United States Patent
Aller

(10) Patent No.: US 12,233,753 B2
(45) Date of Patent: Feb. 25, 2025

(54) SEAT BOLSTER ACTIVATOR

(71) Applicant: GM GLOBAL TECHNOLOGY OPERATIONS LLC, Detroit, MI (US)

(72) Inventor: David M. Aller, Grosse Pointe Farms, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 300 days.

(21) Appl. No.: 17/945,152

(22) Filed: Sep. 15, 2022

(65) Prior Publication Data

US 2024/0092227 A1    Mar. 21, 2024

(51) Int. Cl.
*B60N 2/02* (2006.01)
*B60N 2/24* (2006.01)

(52) U.S. Cl.
CPC . *B60N 2/02* (2013.01); *B60N 2/24* (2013.01)

(58) Field of Classification Search
None
See application file for complete search history.

(56) References Cited

U.S. PATENT DOCUMENTS

| | | | | |
|---|---|---|---|---|
| 4,522,445 A * | 6/1985 | Goldner | ......... | B60N 2/986 297/464 |
| 4,796,955 A * | 1/1989 | Williams | ......... | B60N 2/914 297/452.41 |
| 5,022,709 A * | 6/1991 | Marchino | ......... | B60N 2/99 297/452.36 |
| 5,364,167 A * | 11/1994 | Aoki | ......... | B60N 2/99 297/452.23 |
| 6,672,666 B2 * | 1/2004 | Stiller | ......... | B60N 2/99 297/284.9 |

* cited by examiner

*Primary Examiner* — Joseph D. Pape
(74) *Attorney, Agent, or Firm* — CANTOR COLBURN LLP

(57) ABSTRACT

A seat having a seating area, an interior side bolster disposed on a first side of the seating area, and an exterior side bolster disposed on a second side of the seating area. The exterior side bolster includes an activator slidably disposed within an aperture of the exterior side bolster. The activator adjusts a height of the exterior side bolster based on a position of the activator within the aperture.

13 Claims, 5 Drawing Sheets

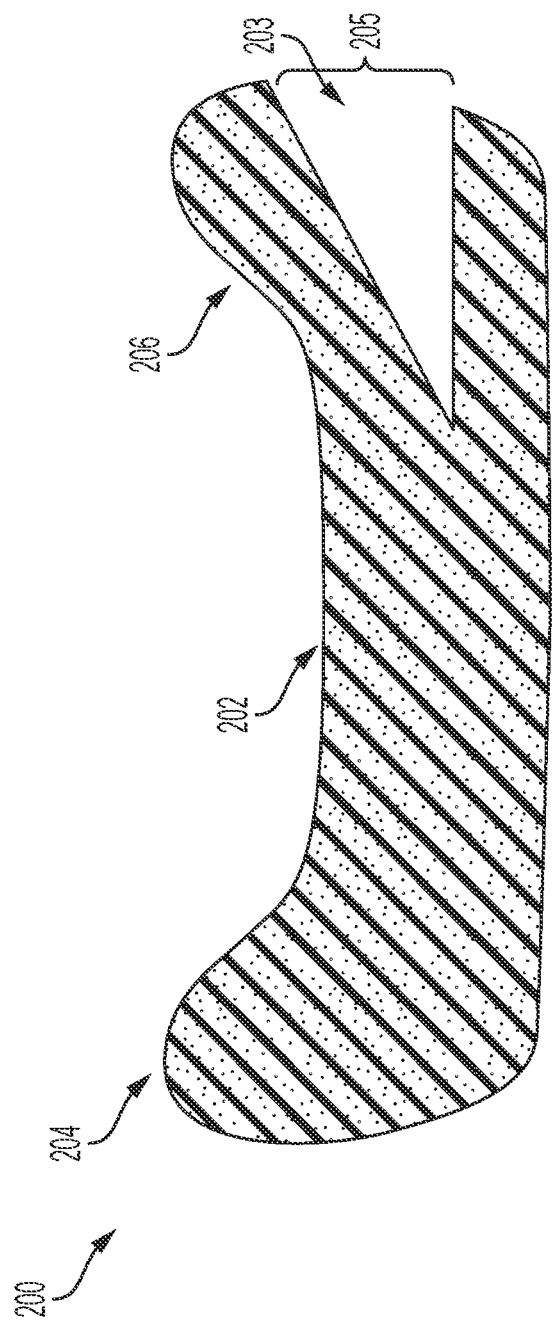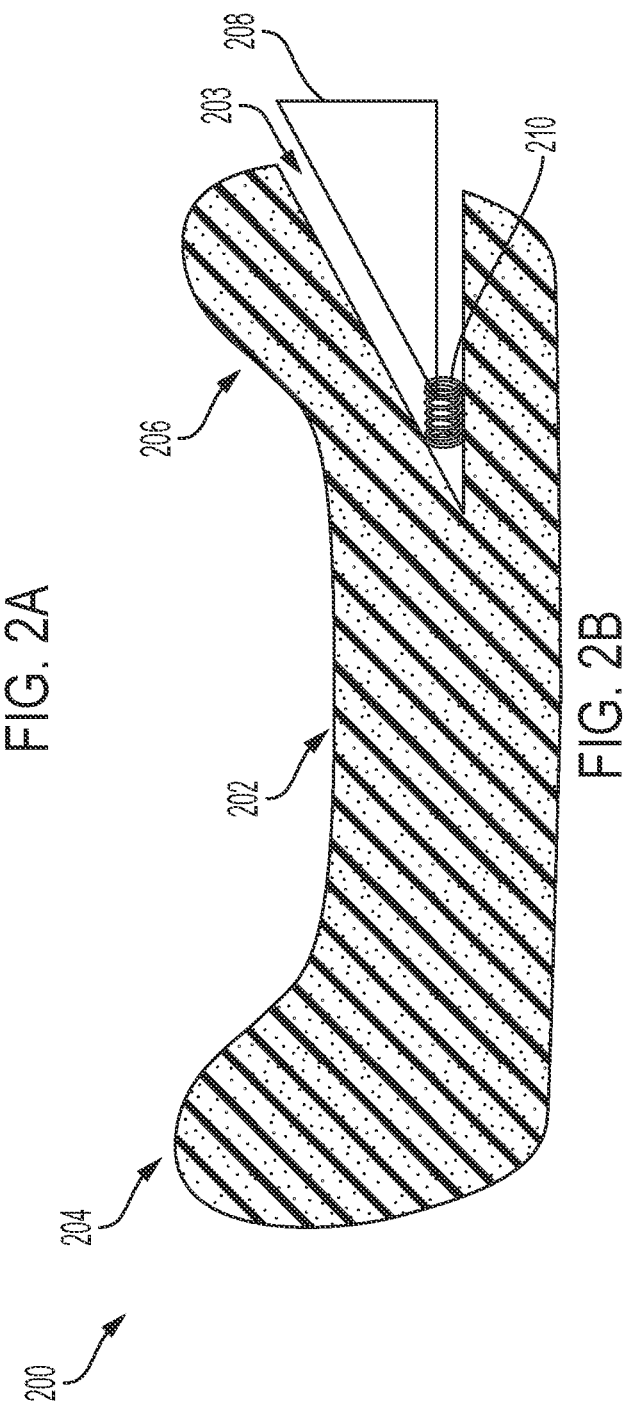

SEAT BOLSTER ACTIVATOR

INTRODUCTION

The present invention relates to vehicle seats having side bolsters in the seat cushion and in particular to side bolsters with activators.

Vehicle seats, particularly bucket seats, are often formed with side bolsters along the sides of the seat. The side bolsters provide a snug fit and support to a seat occupant. Typically, the side bolsters are formed by providing increased foam thickness in the seat cushion along the lateral side edges of the seat cushion. While the increased thickness of the side bolsters provides a snug fit for the occupant, the increased thickness can present an obstacle to the occupant during ingress and egress of the vehicle.

SUMMARY

In one exemplary embodiment, a seat is provided. The seat includes a seating area, an interior side bolster disposed on a first side of the seating area, and an exterior side bolster disposed on a second side of the seating area. The exterior side bolster includes an activator slidably disposed within an aperture of the exterior side bolster. The activator adjusts a height of the exterior side bolster based on a position of the activator within the aperture.

In addition to the one or more features described herein the height of the exterior side bolster is approximately co-planer with a height of the interior side bolster when the activator is in an engaged position.

In addition to the one or more features described herein the height of the exterior side bolster is approximately co-planer with a height of the seating area when the activator is in a disengaged position.

In addition to the one or more features described herein the seat also includes a spring configured to bias the activator into a disengaged position.

In addition to the one or more features described herein the spring is affixed to at least one of the activator and the exterior side bolster.

In addition to the one or more features described herein the activator includes a first end disposed towards a front of the seat and a second end disposed towards a rear of the seat and wherein a height of the activator decreases from the first end towards the second end.

In addition to the one or more features described herein the activator includes one or more guide members configured to restrict a movement of the activator in a front-to-back direction with respect to the seat.

In one exemplary embodiment, a vehicle is provided. The vehicle includes a door and a seat disposed adjacent to the door. The seat includes a seating area, an interior side bolster disposed on a first side of the seating area, and an exterior side bolster disposed on a second side of the seating area. The exterior side bolster includes an activator slidably disposed within an aperture of the exterior side bolster. The activator adjusts a height of the exterior side bolster based on a position of the activator within the aperture.

In addition to the one or more features described herein the door includes an activation area configured to contact the activator when the door is in a closed position.

In addition to the one or more features described herein the height of the exterior side bolster is approximately co-planer with a height of the interior side bolster when the door is in the closed position.

In addition to the one or more features described herein the height of the exterior side bolster is approximately co-planer with a height of the seating area when the door is in an open position.

In addition to the one or more features described herein the seat also includes a spring configured to bias the activator into a disengaged position.

In addition to the one or more features described herein the spring is affixed to at least one of the activator and the exterior side bolster.

In addition to the one or more features described herein the activator includes a first end disposed towards a front of the seat and a second end disposed towards a rear of the seat and wherein a height of the activator decreases from the first end towards the second end.

In addition to the one or more features described herein the activator includes one or more guide members configured to restrict a movement of the activator in a front-to-back direction with respect to the seat.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIGS. 2A and 2B are schematic diagrams illustrating cross-sectional views of a seat having side bolsters having an activator in accordance with an exemplary embodiment;

DETAILED DESCRIPTION

Figure 1:
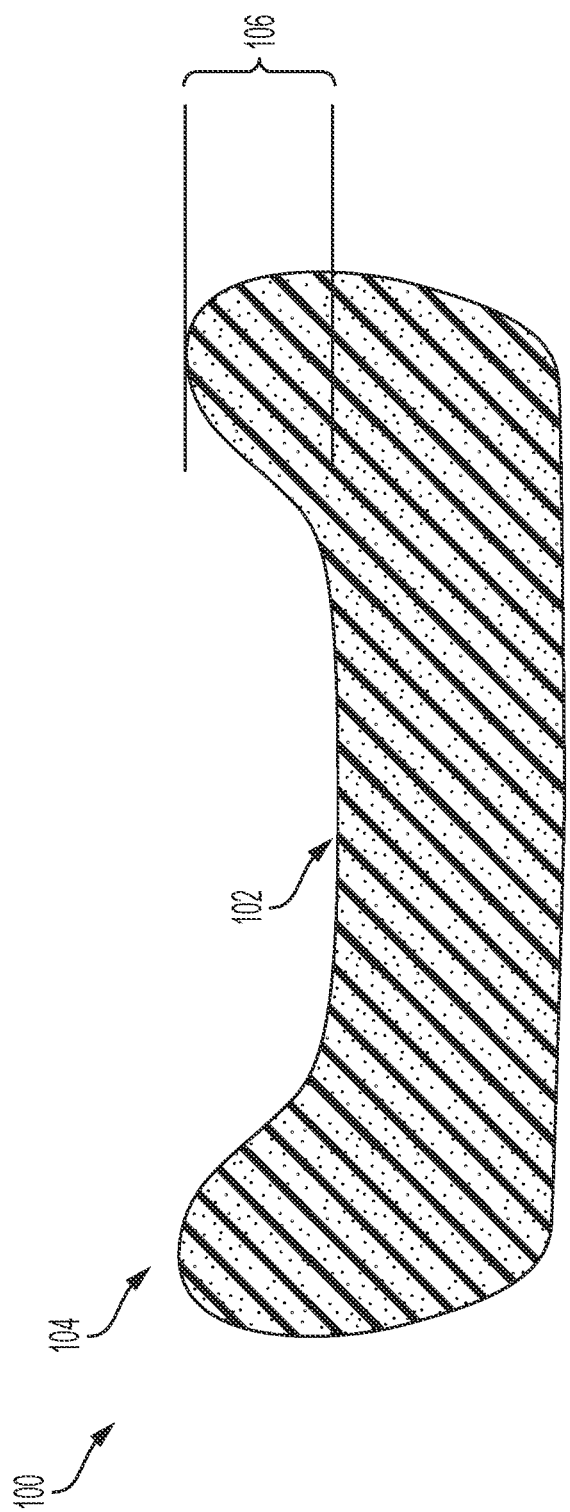
FIG. 1 is a schematic diagram illustrating a cross-sectional view of a seat having side bolsters.

The following description is merely exemplary in nature and is not intended to limit the present disclosure, its application, or uses. Various embodiments of the disclosure are described herein with reference to the related drawings. Alternative embodiments of the disclosure can be devised without departing from the scope of the claims. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship.

Turning now to an overview of the aspects of the disclosure, embodiments of the disclosure include a seat having a side bolster with an activator in accordance with an exemplary embodiment. In exemplary embodiments, the activator is configured to interact with a door of the vehicle to selectively adjust a height of a side bolster. For example, when a door of the vehicle is in an open position, the activator is in a disengaged position which results in the side bolster having a height that is approximately equal to the height of a seating surface. Accordingly, when the door is in the open position, an occupant does not have to overcome the seat bolster to enter or exit the vehicle. However, when a door of the vehicle is in a closed position, the activator is in an engaged position which results in the side bolster having a height that is higher than the height of a seating surface. Accordingly, when the door is in the closed position, the seat bolster provides support to the occupant.

Referring now to FIG. 1, a schematic diagram illustrating a cross-sectional view of a seat having side bolsters is shown. As illustrated, the seat 100 includes a seating area 102 that is disposed between two side bolsters 104. The side bolsters 104 are configured to have a height differential 106 above the seating area 102 to keep an occupant disposed in the seating area 102.

Referring now to FIGS. 2A and 2B schematic diagrams illustrating cross-sectional views of a seat 200 in accordance with an exemplary embodiment are shown. As illustrated, the seat 200 includes a seating area 202 that is disposed between an interior side bolster 204 and an exterior side bolster 206. In exemplary embodiments, the exterior side bolster 206 is the side bolster that is located next to a door of the vehicle, when the door is in a closed position.

As best shown in FIG. 2A, the exterior side bolster 206 includes an aperture 203. The aperture 203 is configured to run laterally along the side of the seat 200. In exemplary embodiments, the aperture 203 has a height 205 that generally decreases from the front of the seat towards the back of the seat. In exemplary embodiments, the shape and dimensions of the aperture 203 may vary depending on the type of seat and type of vehicle.

As best shown in FIG. 2B, the seat 200 includes an activator 208 that is configured to be inserted into the aperture 203. In exemplary embodiments, when a door of a vehicle including the seat 200 is closed, a portion of the door comes into contact with the activator 208 which forces the activator 208 into the aperture 203. The seat 200 also includes a spring 210 that is disposed within the aperture 203. The spring 210 is configured to push the activator 208 away from the seating area 202. In exemplary embodiments, a bottom surface of the aperture 203 and the activator 208 include a tongue and groove configuration (not shown) that limits an amount and a direction that the activator 208 is able to freely move within the aperture 203. In exemplary embodiments, the activator 208 has a height that generally decreases from the front of the seat towards the back of the seat. In exemplary embodiments, the shape and dimensions of the activator 208 may vary depending on the type of seat and type of vehicle.

Figure 3:
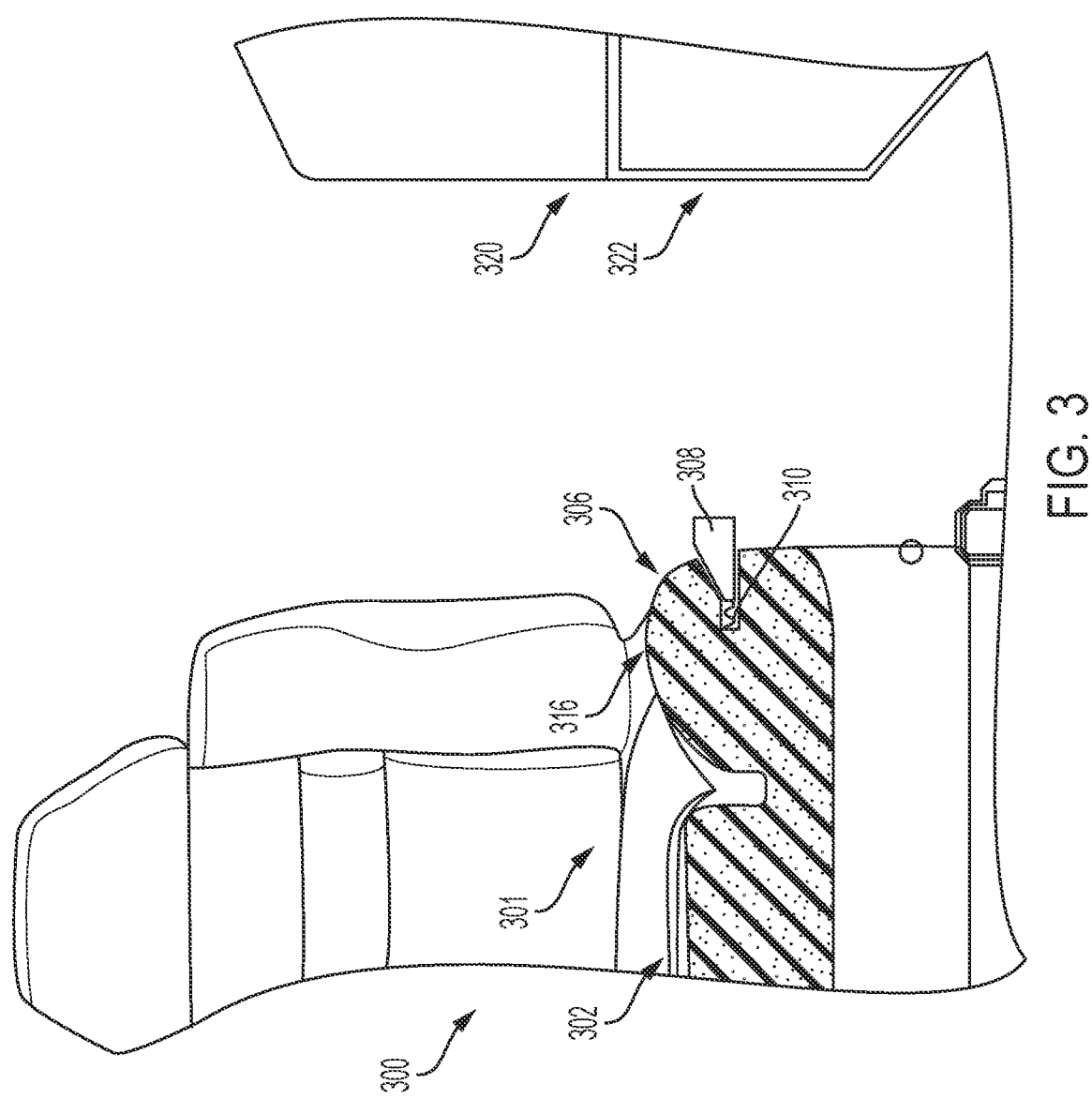
FIG. 3 is a schematic diagram illustrating an interior of a vehicle having a seat with a side bolster activator in a disengaged position in accordance with an exemplary embodiment.

Referring now to FIG. 3, a schematic diagram illustrating an interior 300 of a vehicle having a seat 301 in accordance with an exemplary embodiment is shown. As illustrated, the seat 301 includes a seating area 302 and an exterior side bolster 306. The exterior side bolster 306 includes an activator 308 that is at least disposed inside an aperture of the exterior side bolster 306. The exterior side bolster 306 also includes a spring 310 configured to force the activator 308 towards a door 320. The door 320 includes an activation area 322 that is configured to come into contact with the activator 308 when the door 320 is in the closed position. When the door 320 is in the open position, as shown, the spring 310 forces the activator 308 towards the door 320 and the activator 308 is in a disengaged position.

In exemplary embodiments, when the activator 308 is in the disengaged position, the spring 310 forces the activator 308 at least partially out of the aperture. As a result, the exterior side bolster 306 is no longer being forced in an upward position and the exterior side bolster 306 has an upper surface 316 that is substantially level with the seating area 302. In exemplary embodiments, when the activator 308 is in the disengaged position the height of the exterior side bolster 306 is reduced thereby allowing the occupant of the seat 301 to more easily access the seating area 302.

Figure 4:
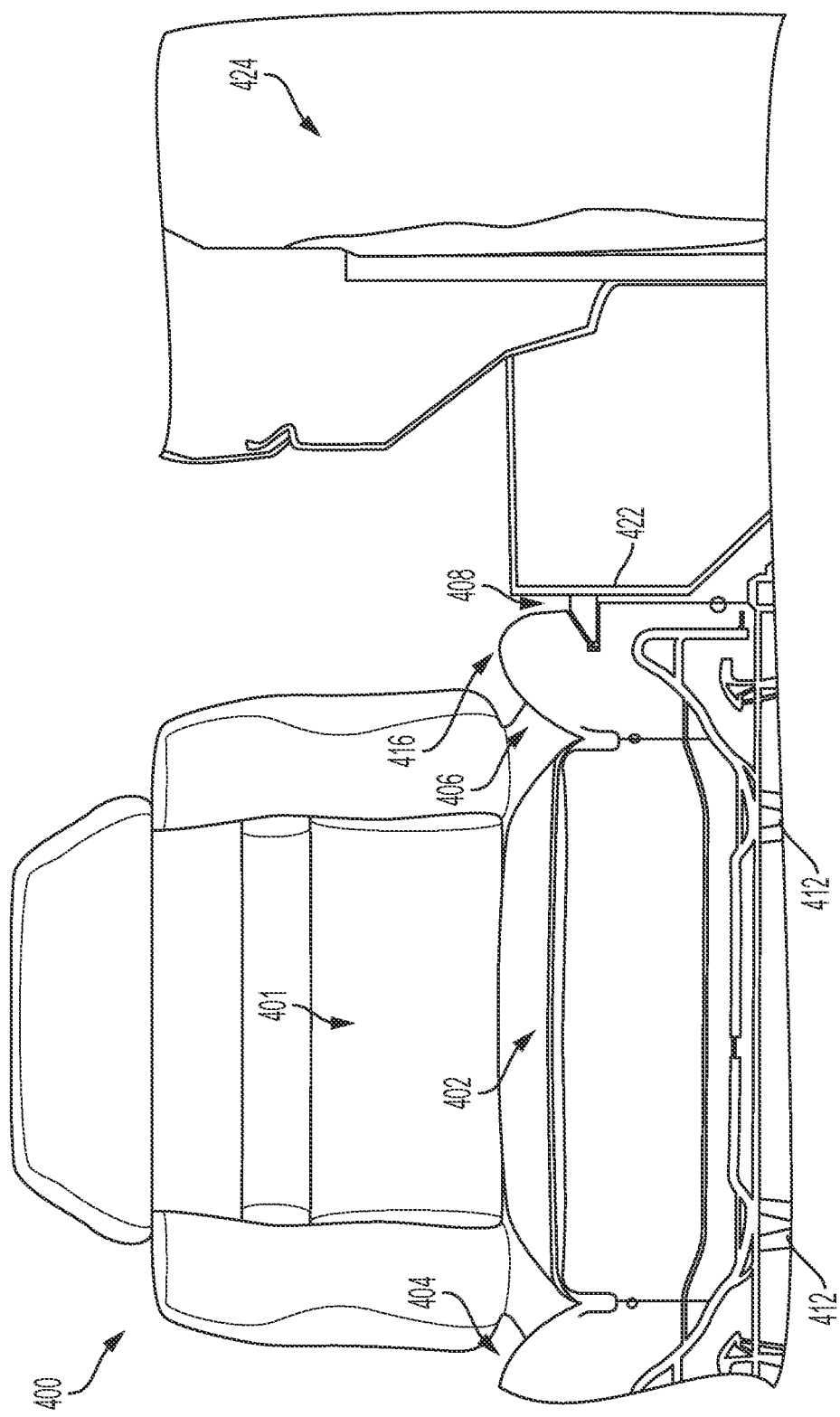
FIG. 4 is a schematic diagram illustrating an interior of a vehicle having a seat with a side bolster activator in an engaged position in accordance with an exemplary embodiment.

Referring now to FIG. 4, a schematic diagram illustrating an interior 400 of a vehicle having a seat 401 in accordance with an exemplary embodiment is shown. As illustrated, the seat 401 includes a seating area 402 disposed between an interior side bolster 404 and an exterior side bolster 406. The exterior side bolster 406 includes an activator 408 that is at least disposed inside an aperture of the exterior side bolster 406. The interior 400 also includes a door 424 having an activation area 422 that is configured to come into contact with the activator 408 when the door 424 is in the closed position. When the door 424 is in the closed position, as shown, the activation area 422 forces the activator 408 towards the seating area 402, and the activator 408 is in an engaged position.

In exemplary embodiments, when the activator 408 is in the engaged position, the activation area 422 of the door 424 forces the activator 408 into the aperture of the exterior side bolster 406. As a result, the exterior side bolster 406 has an upper surface 416 which is substantially higher than the seating area 402. In exemplary embodiments, when the activator 408 is in the engaged position the height of the exterior side bolster 406 is increased to help secure the occupant in the seating area 402.

In exemplary embodiments, the seat 401 is configured to have a position that can be adjusted by the occupant. In one embodiment, the seat 401 is mounted on a pair of rails 412 that allow the seat to move a fixed distance forward and backward within the interior 400 of the vehicle. In addition, the seat 401 includes one or more actuators (not shown) that are configured to move the seat 401 up and down inside the interior 400 of the vehicle. In exemplary embodiments, the activation area 422 of the door 424 has a size that is large enough to ensure that the activation area 422 will come into contact with the activator 408 no matter the position of the seat 401 within the travel box. As used herein the term travel box refers to an area that consists of the possible locations of the seat within the interior 400 of the vehicle.

In one embodiment, the activator 408 is configured to come into direct contact with the activation area 422. In another embodiment, one or more materials may be disposed between the activator 408 and the activation area 422. For example, the activator 408 may be disposed within a seat cover that at least partially encloses the seat 401. In these cases, the activation area 422 may directly contact the seat cover, which in turn directly contacts the activator 408.

Figure 5B:
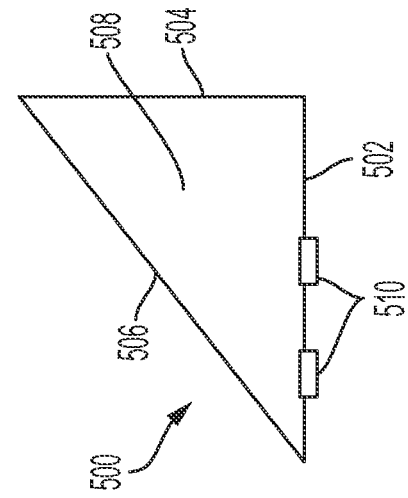
FIG. 5B is a schematic diagram illustrating a side view of an activator for a side bolster activator in accordance with an exemplary embodiment.
Figure 5A:
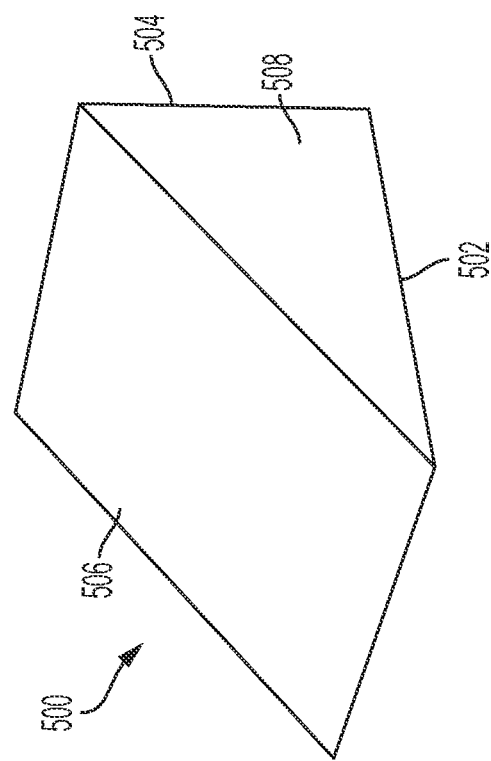
FIG. 5A is a schematic diagram illustrating an activator for a side bolster activator in accordance with an exemplary embodiment.

Referring now to FIG. 5A a schematic diagram illustrating an activator 500 for a side bolster activator in accordance with an exemplary embodiment is shown. As illustrated, the activator 500 includes a bottom surface 502, a first end surface 508, a top surface 506 and an impact surface 504. In exemplary embodiments, the impact surface 504 is configured to come into contact with an activation area of the door of a vehicle, when the door is in the closed position. The top surface 506 is configured to interact with the seat bolster to selectively increase and decrease a height of the seat bolster.

In one embodiment, as best shown in FIG. 5B, one or more guide members 510 extend from the bottom surface 502 of the activator 500. The guide members 510 are configured to interact with one or more grooves in the seat bolster to restrict the movement of the activator 500 in the front-to-back direction with respect to the seat bolster.

Figure 5C:
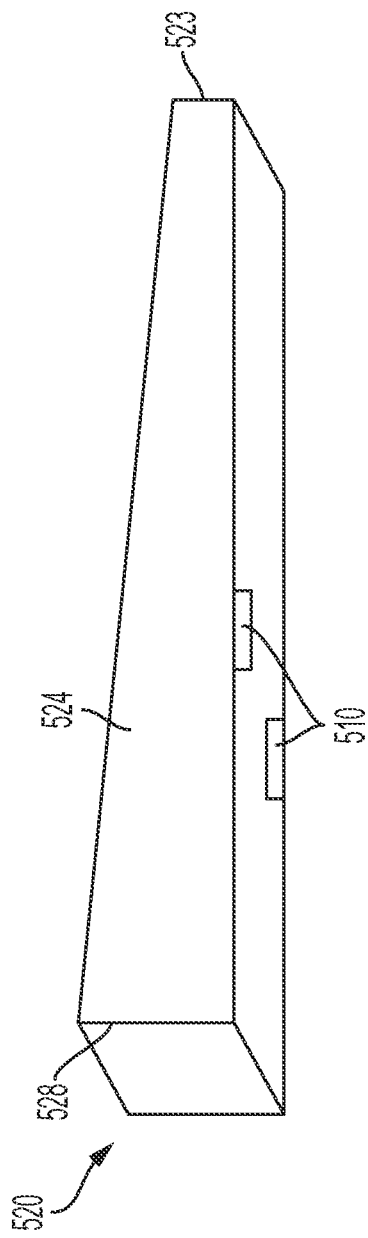
FIG. 5C is a schematic diagram illustrating a side view of an activator for a side bolster activator in accordance with an exemplary embodiment.

Referring now to FIG. 5C, a side view of an activator 520 for a side bolster in accordance with an exemplary embodiment is shown. The activator 520 includes an impact surface 524 that extends from a first end 528 to a second end 523. In exemplary embodiments, the first end 528 is disposed towards a front of a seat and the second end 523 is disposed towards a back of the seat. As shown, the height of the activator 520 decreases from the first end 528 towards the second end 523.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A seat comprising:
   a seating area;
   an interior side bolster disposed on a first side of the seating area; and
   an exterior side bolster disposed on a second side of the seating area, the exterior side bolster comprising an activator slidably disposed within an aperture of the exterior side bolster,
   wherein the activator adjusts a height of the exterior side bolster based on a position of the activator within the aperture, and
   wherein the height of the exterior side bolster is approximately co-planer with a height of the seating area when the activator is in a disengaged position.

2. The seat of claim 1, wherein the height of the exterior side bolster is approximately co-planer with a height of the interior side bolster when the activator is in an engaged position.

3. The seat of claim 1, further comprising a spring configured to bias the activator into a disengaged position.

4. The seat of claim 3, wherein the spring is affixed to at least one of the activator and the exterior side bolster.

5. The seat of claim 1, wherein the activator includes a first end disposed towards a front of the seat and a second end disposed towards a rear of the seat and wherein a height of the activator decreases from the first end towards the second end.

6. The seat of claim 1, wherein the activator includes one or more guide members configured to restrict a movement of the activator in a front-to-back direction with respect to the seat.

7. A vehicle comprising:
   a door; and
   a seat disposed adjacent to the door, wherein the seat comprises:
      a seating area;
      an interior side bolster disposed on a first side of the seating area; and
      an exterior side bolster disposed on a second side of the seating area adjacent to the door, the exterior side bolster comprising an activator slidably disposed within an aperture of the exterior side bolster,
   wherein the activator adjusts a height of the exterior side bolster based on a position of the activator within the aperture, and
   wherein the door includes an activation area configured to contact the activator when the door is in a closed position.

8. The vehicle of claim 7, wherein the height of the exterior side bolster is approximately co-planer with a height of the interior side bolster when the door is in the closed position.

9. The vehicle of claim 7, wherein the height of the exterior side bolster is approximately co-planer with a height of the seating area when the door is in an open position.

10. The vehicle of claim 7, further comprising a spring configured to bias the activator into a disengaged position.

11. The vehicle of claim 10, wherein the spring is affixed to at least one of the activator and the exterior side bolster.

12. The vehicle of claim 7, wherein the activator includes a first end disposed towards a front of the seat and a second end disposed towards a rear of the seat and wherein a height of the activator decreases from the first end towards the second end.

13. The vehicle of claim 7, wherein the activator includes one or more guide members configured to restrict a movement of the activator in a front-to-back direction with respect to the seat.

* * * * *